Oct. 28, 1941. A. E. ALBIN 2,260,816
METHOD OF MANUFACTURING FABRIC TUBING
Filed Jan. 11, 1940 8 Sheets-Sheet 2

Alonzo E. Albin,
Inventor.
Haynes, Koenig and Wolf
Attorneys

Oct. 28, 1941.   A. E. ALBIN   2,260,816
METHOD OF MANUFACTURING FABRIC TUBING
Filed Jan. 11, 1940   8 Sheets-Sheet 3

Alonzo E. Albin,
Inventor.
Haynes, Koenig and Wolf,
Attorneys.

Oct. 28, 1941.　　　　A. E. ALBIN　　　　2,260,816
METHOD OF MANUFACTURING FABRIC TUBING
Filed Jan. 11, 1940　　　　8 Sheets-Sheet 4

Alonzo E. Albin,
Inventor
Haynes, Koenig and Wolf
Attorneys.

Oct. 28, 1941.  A. E. ALBIN  2,260,816
METHOD OF MANUFACTURING FABRIC TUBING
Filed Jan. 11, 1940  8 Sheets-Sheet 6

Oct. 28, 1941.  A. E. ALBIN  2,260,816
METHOD OF MANUFACTURING FABRIC TUBING
Filed Jan. 11, 1940   8 Sheets-Sheet 7

FIG.12.

Oct. 28, 1941.    A. E. ALBIN    2,260,816
METHOD OF MANUFACTURING FABRIC TUBING
Filed Jan. 11, 1940    8 Sheets-Sheet 8

Alonzo E. Albin,
Inventor.
Haynes, Koenig and Wolf,
Attorneys.

Patented Oct. 28, 1941

2,260,816

UNITED STATES PATENT OFFICE 2,260,816

METHOD OF MANUFACTURING FABRIC TUBING

Alonzo E. Albin, Freeport, N. Y., assignor to Bemis Bro. Bag Company, St. Louis, Mo., a corporation of Missouri Application January 11, 1940, Serial No. 313,337

2 Claims. (Cl. 112—63)

This invention relates to a method and apparatus for making tubing, and, more particularly, biased-seam fabric tubing.

Among the several objects of the invention may be noted the provision of means for economically manufacturing in quantity fabric tubing of the class made by bias-seaming opposite edges of a straight fabric strip; and the provision of a method and apparatus of the class described in which the tubing is made with a high degree of accuracy. Other objects will be in part obvious and in part pointed out hereinafter.

The invention accordingly comprises the steps and sequence of steps, elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention.

Similar reference characters indicate corresponding parts throughout the several views of the drawings.

It is known that packages may be made by helically seaming the opposite edges of a plain woven fabric strip. But, two difficulties present themselves in accomplishing this end:

First, the tubing which results from the uncontrolled helical seaming of a plain woven strip tends to have unequal diameters throughout its length and other undesirable bulges caused by the fact that the seaming operation heretofore used cannot readily be carried out so as to juxtapose at the helical seam equal edge lengths of fabric.

Second, the helical seaming, when done by a stationary sewing machine (the most economical type of sewing machine to use), requires the application of a twist to the fabric as it is seamed and as the seamed fabric issues from the sewing machine it retains the twist, since it is moved longitudinally without substantial rotation against the twist. Such a twist makes the fabric unfit for subsequent operations until the twist is eliminated. To manually eliminate twist in one step, and then to roll up the tubing, has been found to be uneconomical.

The present invention obtains accurate registry of equal lengths of fabric edges at the seam so as to obtain an accurate diameter of finished tubing, and also provides a continuous system for untwisting the tubing subsequent to the seaming operation and for winding up the untwisted (flat) material. Thus, there is obtained, by means of an improved sequence of operations, an accurate tubular product without twist, which is stored ready for use in compact rolls.

Figure 1:
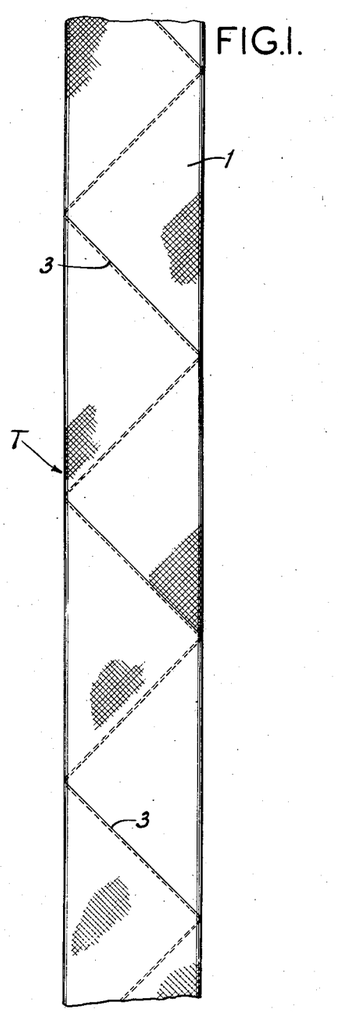
Fig. 1 is a plan view of a finished but flat length of helically seamed tubing which is the product of the present method and apparatus.

Referring now more particularly to Fig. 1, there is shown at T the tubular material which is the product of the present method and apparatus. This comprises ordinary woven fabric 1 (Fig. 2) of loose or tight weave, depending upon the application to which the final tubular material T is to be put. This material is to be helically seamed as indicated at 3 in Fig. 1. It will be understood that the tubing is shown flat in Fig. 1, and that its true diameter is less when filled than the width indicated in Fig. 1.

Figure 2:
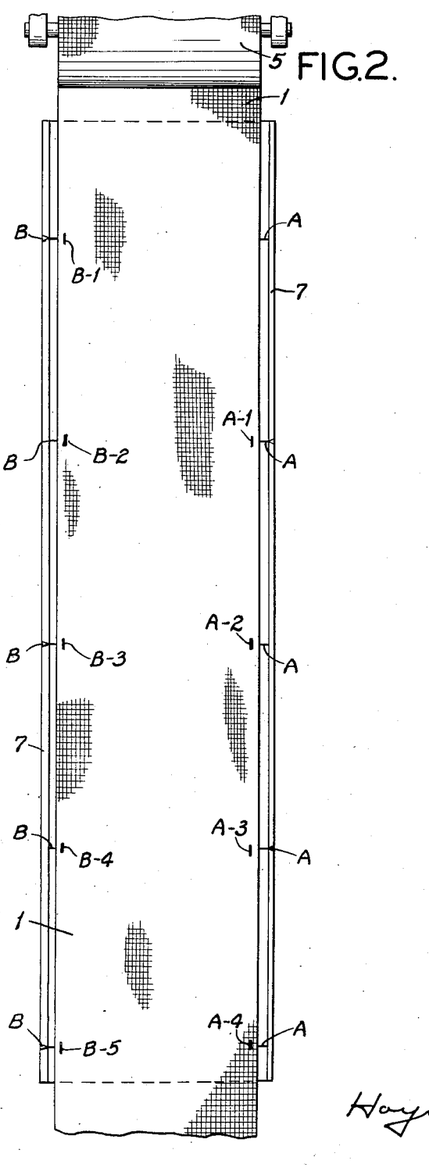
Fig. 2 is a plan view illustrating a hand method of effecting certain index registry markings.

In Fig. 2 the material 1 is indicated in its condition as raw material for the present process. This fabric 1 is drawn from a raw-material supply roll 5. It is drawn out over a marking table 7 for certain hand marking to be described.

Marking or indexing operations herein described may be carried out either by hand or by machine. In the former case a certain freedom of marking arrangement is permissible, as will be described; whereas in the case of machine marking certain inherent limitations require special marking arrangements, which will hereinafter be specified.

Referring again to the hand marking operations of Fig. 2, it will be seen that the marking table 7 is provided on each side, at suitable intervals, with marks B (on the left) and A (on the right). Thus, when the cloth 1 is drawn from the roll 5 upon the table 7, corresponding index marks B—1, B—2, etc., are placed on the fabric opposite marks B; and marks A—1, A—2, etc., are placed opposite marks A. The first effective mark A—1 in the "A" series is placed opposite the second effective mark B—2 in the "B" series. This staggers the A—1 mark with respect to the B—1 mark. As will appear in the machine-marking alternative of the invention, the series of marks B—2, B—3, etc., may be in addition staggered with respect to the marks A—1, A—2, etc.; but in the hand-applying scheme there is no advantage to such second staggering.

From the above it will be seen that the table 7 functions as a scale for laying down predeterminately spaced or staggered series of marks B—1 and A—1.

The next step after that shown in Fig. 2 may consist in again storing the cloth 1 as by folding it into piles, or by re-rolling it. Thereafter, or directly after the operation shown in Fig. 2, the following operations are carried out.

Figure 4:
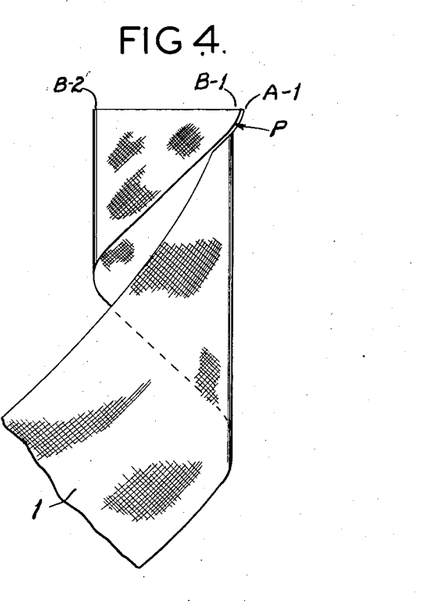
Fig. 4 is a plan view showing the beginning of a seaming operation.

The cloth 1 is severed on a bias between corresponding points on successive staggered marks B—1 and A—1 on opposite edges. This produces a scarfed edge and thereafter the acute angle of the scarf is brought toward its obtuse angle and the first mark B—1 (on the left-hand side) is brought into substantial registry with the first mark A—1 (on the right-hand side), as indicated in Fig. 4. The main length of the strip 1 is at the same time pushed aside to place the upper edge lateral as in Fig. 4, so that the juxtaposed edges form a point P at the right for seaming under the head of a stationary sewing machine. Seaming is started at the juxtaposed registry marks B—1 and A—1, and thereafter continued along the joined edges of the cloth, successive marks B—2, B—3, etc., being registered respectively with staggered marks A—2, A—3, etc.

Without the use of registry or index marks B—1, A—1, etc., it has been found that an operator variably stretches or crinkles one side or the other of the cloth, and thus varies the helical angle of the seam; and, if the seam is not sewn at a constant helical angle, the result is a tube of varying diameter, instead of a tube of constant diameter, such as shown in Fig. 1. It is the purpose of the succeeding registry marks B—1, A—1, etc., to provide means for the operator to obtain an accurate registry between successive points down the edges which make up the seam, so that equal lengths of cloth are adjacently sewn and the helix angle thus maintained constant and thus also the diameter of the resulting tube. Thus, the operator in making the helical seam brings into registry successive preceding marks B—1, etc. with successive marks A—1, etc., the marks A—1, etc., lying staggered longitudinally behind B—1, etc., respectively, by an amount calculated to produce preferably a 45° helix (and a corresponding predetermined tube diameter) from width of material being used. It is to be understood that other than a 45° helix angle may be adopted, but that 45° is preferable because of the resulting axial symmetry between warp and woof threads.

Figure 5:
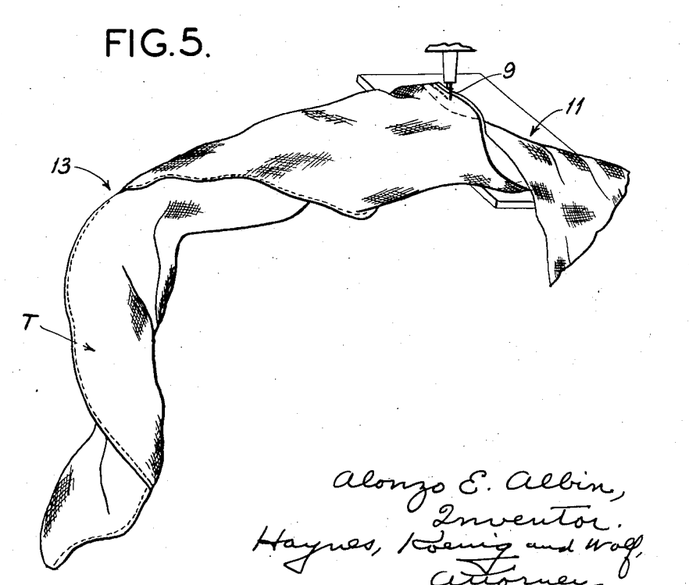
Fig. 5 is a perspective view showing said seaming operation proceeding with consequent twist and forming a collapsed fabric tubing.

In Fig. 5 is indicated a twisted condition that occurs when a strip of woven material is helically seamed on a stationary sewing machine. Due to the inability of the operator to untwist with facility the helically seamed tubing which proceeds from the sewing machine, this tubing is allowed to proceed from the sewing machine initially without substantial axial rotation. Thus the cloth assumes a rumpled and twisted condition, such as indicated in Fig. 5. In this figure the sewing machine needle is shown at numeral 9, and at 11 is indicated how twist is placed in the cloth in order to bring it into sewing position under the needle 9. At the region 13 the operator no longer has control of the relatively limp goods, which then is caused to proceed axially without rotation and which thus remains twisted.

It is the purpose of the apparatus next to be described to roll up the helically seamed tubing and while doing this to take out the twist acquired during sewing. This apparatus is shown in Figs. 6–10 and consists in a frame 15 upon which is supported a skeleton platform 17. Depending from this platform 17 is a support 19 for a rotary carriage 21. The carriage 21 carries a pulley 23 (Fig. 10) which is driven from a pulley 27 (Fig. 7) by a belt 25. The pulley 27 is driven through a speed reducing box 29 from a shaft 31. The shaft 31 is driven from a countershaft 35 by a set of V-belts 33. The countershaft 35 is driven from a clutch 39 by a set of V-belts 37. The clutch 39 is driven by a main shaft 41 which in turn is driven from a motor 45 by a set of V-belts 43. The clutch 39 is controlled from a spring-returned lever 2. The lever 2 is under control of a flexible connector 4 operable from a control lever 6. The flexible connector 4 extends over pulleys 8 so that force for the lever 6 is properly applied. A return spring is shown at 10.

All pulleys on the counter-shaft 35 are of the resilient side-plate type for V-belts. Thus, when the carriage 47 is moved toward the clutch 39 (Fig. 6), the pulley 53 on the left side automatically adjusts to a larger effective diameter; whereas the pulleys 55 on the right side automatically adjust to a smaller effective diameter. Thus, the velocity ratio between the shaft 41 and the shaft 31 is changed by adjustment of the position of carriage 47. Since speed changing apparatus of the class indicated by the carriage and the pulleys 53 and 55 is known, further details are believed to be unnecessary here. Furthermore, other speed changing apparatus may be used at this point.

Figure 6:
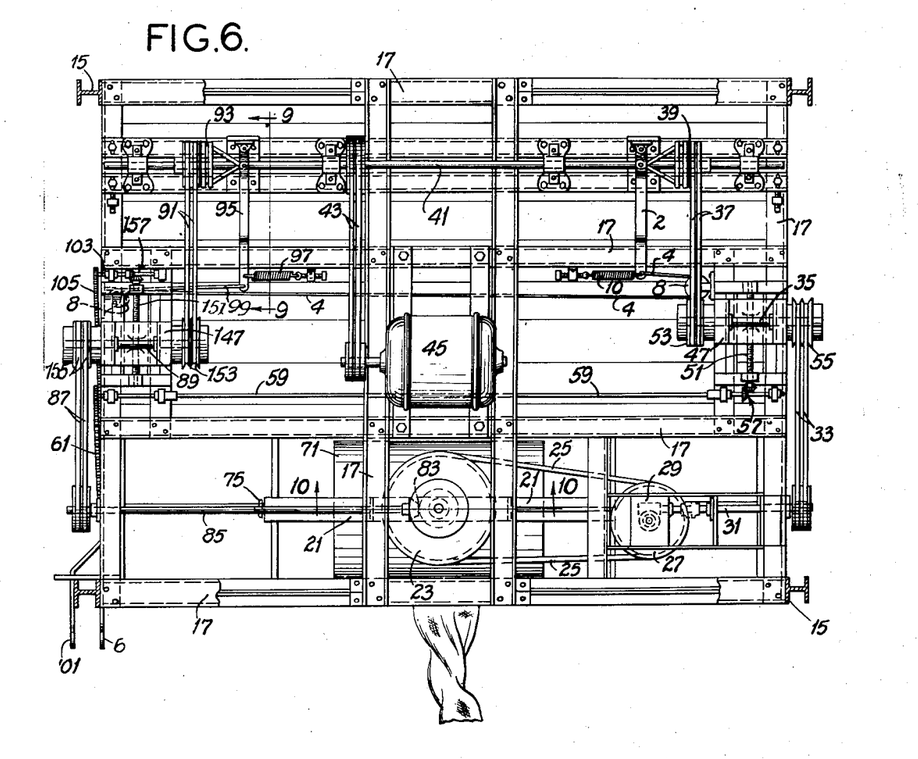
Fig. 6 is a plan view of a winding machine for untwisting and winding the twisted product shown in Fig. 5.
Figure 7:
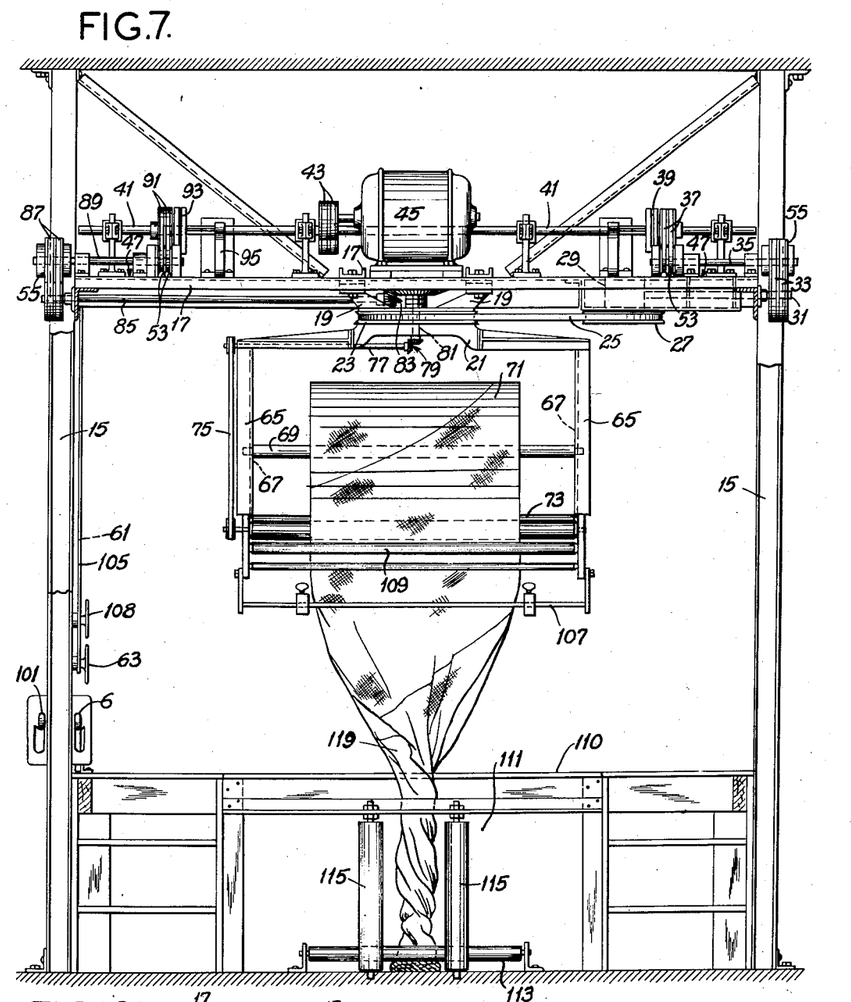
Fig. 7 is a front elevation of Fig. 6.
Figure 8:
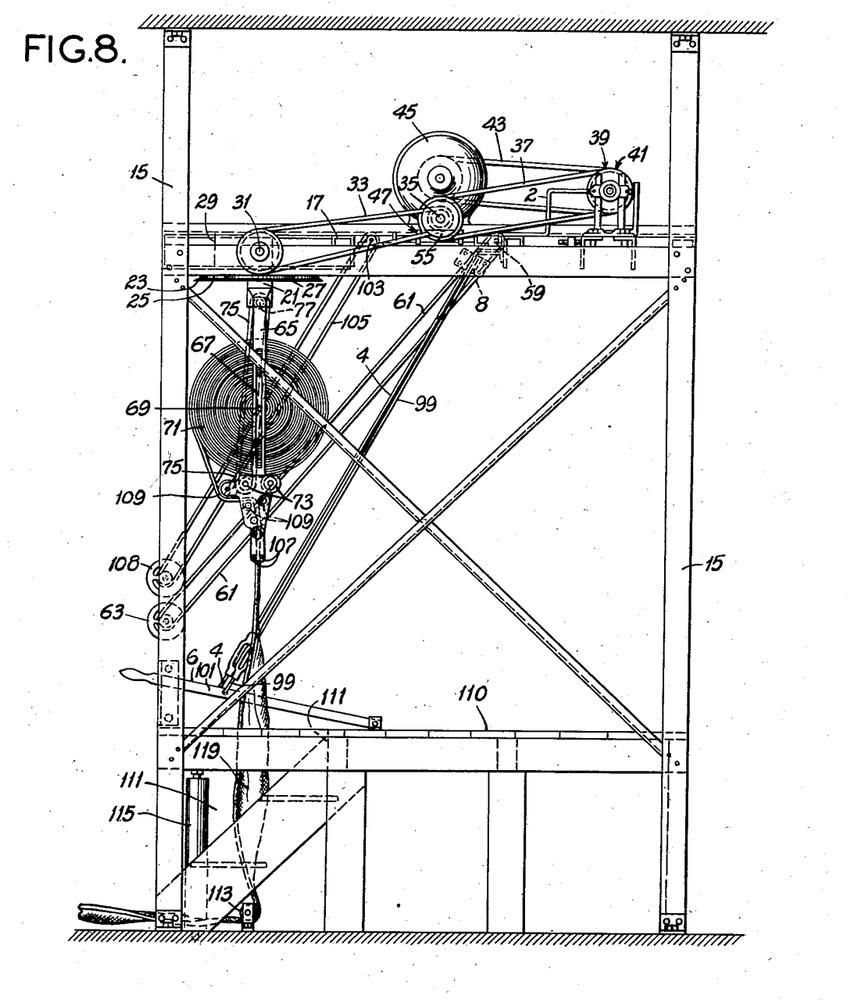
Fig. 8 is a side elevation of Fig. 6 taken from the right.
Figure 9:
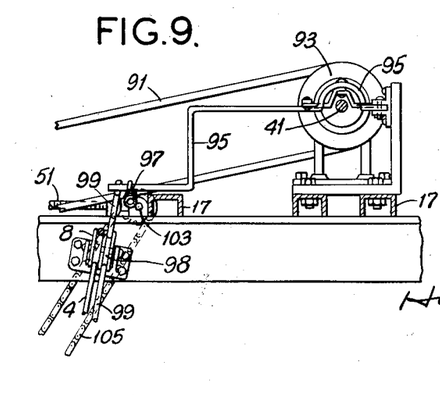
Fig. 9 is a vertical, detail section taken on line 9—9 of Fig. 6.

Control of the lead screw 51 is effected by means of a set of bevel gears 57 driven from a shaft 59 which, through a chain drive 61, is under control of a variable speed control wheel 63.

Figure 10:
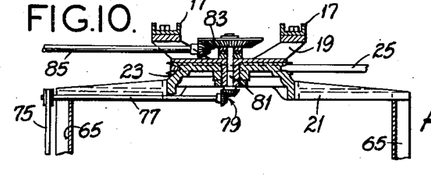
Fig. 10 is a vertical, detail section taken on line 10—10 of Fig. 6.

The rotary carriage 21 has downwardly extending arms 65 in which are slots 67 for accommodating the rotary lateral ends of a roll spindle 69, upon which a roll 71 of tubing is formed. Beneath the roll 71 is a pair of supporting rollers 73, one of which is live, and the other idling. These rollers 73 support the roll of fabric 71 as it is formed. The live roll 73 is driven through a belt drive 75 from a countershaft 77, which, through a bevel gear set 79, is driven from a vertical shaft 81 within the depending support 19 (Fig. 10). A bevel gear set 83 which drives the shaft 81 is itself driven from a shaft 85 which is supported from the skeleton platform 17. A V-belt drive 87 for the shaft 85 is driven from a counter-shaft 89. The counter-shaft 89 is in an adjustable frame 47 and is driven by means of V-belts 91 from a clutch 93, the latter being driven from the main shaft 41. The clutch 93 is controlled by means of a lever 95 having a return spring 97 and a flexible control member 99 which extends over a suitable pulley 98 and is operable from a second control lever 101.

The control levers 101 and 6 each have a clutch-open and a clutch-closed position in a notched slot.

Pulleys 153 and 155 on the counter-shaft 89 are similar to those similarly enumerated and described in connection with the counter-shaft 35, so that adjustment of position of the counter-shaft 89 results in a change in velocity ratio between the shaft 41 and the shaft 85, the latter controlling the live roller 73. The carriage 147 is under control of a lead screw 151. The lead screw 151 is controlled through a set of bevel gears 157 from a control shaft 103. The control shaft 103 is adjusted by a chain drive 105 from a variable speed control wheel 108.

In view of the above it will be seen that from the motor 45 a controllable clutched connection may be had either with the rotary carriage 21 or with the live supporting and winding roller 73. In the respective connections are also the speed adjusting means so that the speed of rotation of the fabric roll 71 on its horizontal axis may be controlled, as well as its speed of rotation about a vertical axis on the winding carriage 21. The adjustments are independent.

At the bottom of the slotted arms 65 and below the supporting rolls 73 is pivotally supported by means of links 105 a pair of guide bars 107 between which the fabric to be rolled up is threaded. From between the guide bars 107 the cloth is guided to a point between the supporting rollers 73 by means of guide rollers 109.

At the base of the machine is a platform 110 having a suitable central opening 111 at the base of which is mounted a guide roller 113. Ahead of this is mounted a pair of vertical rollers 115. The rollers 113 and 115 serve as lead-in means for directing the material from a position on the floor into the vertical column 119 of said material. As indicated, the lower portion of the column 119 is twisted, and it is this twist that the present machine eliminates. Operation of the apparatus shown in Figs. 6–10 is as follows:

Cloth from the twisted heap which is supplied from the sewing machine is led in between the rolls 115 and around the roll 113 and guided up between the guides 107; then past the guide rollers 109 and between the supporting rollers 73, where it is started onto the roller 69. The start is effected by hand. Then the motor 45 is turned on, thus causing the incipiently-formed roll 71 to rotate on an axis normal or at right angles to the tube axis to draw in more material to be rolled up, while the supporting frame 21 rotates about an axis parallel to the tube axis to cancel the twist in the column of material 119.

It is clear that, as the diameter of the roll 71 increases and its angular velocity decreases, the linear velocity on its surface is constant since it is driven on its surface by the supporting rollers 73. This means that neither the rate of untwisting (rate of rotation of frame 21) nor the rate of cloth application needs to be changed, except to make adaptations to the requirements of the sewing machine operator. This distinguishes from a drive attached to axle 69 which would maintain angular roll velocity constant with changing linear velocity of cloth, which in turn would require constant relative adjustment of the roll drive. In order to accomplish the proper adjustments, manipulation of the wheel 63 and/or 108 is carried out. Except for these adjustments, which are initially made and incidentally may readily be made for a given operator, the rolling and untwisting operations are automatic. After a roll 71 has been completed, it may be removed by removing the spindle 69 from the slots 67. This is done simply by angling the spindle in a vertical plane.

Figure 3:
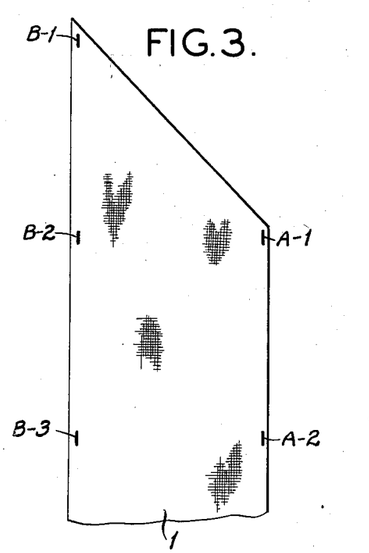
Fig. 3 shows an end-cutting step performed upon the fabric strip of Fig. 2, preparatory to helical seaming.

While the hand marking scheme shown in Figs. 2 and 3 is satisfactory, and in some cases advantageous, an automatic marking means is desirable for increasing output. Such a means is shown in Figs. 11–15. It comprises a frame 121 which, incidentally, may form the inlet end of a folding machine. The strip of woven material 1 is led in over an idling roller 123 and upwardly as at 125 to a roller 127 and under idling and pressure rollers 129 to a reach 131. From the reach 131 it passes to suitable folding elements of the machine (not shown).

The roller 127 is driven from a pulley 133 by means of a chain drive 135. The chain drive 135 is driven from a counter-shaft 137 and the latter is driven by a belt 139 from a motor 141, carried on the frame 121. Arranged in front of the vertical reach 125 of material is a sub-frame having two lateral vertical standards 143 (Fig. 12) and a central standard 145. Horizontal supporting rods 147 are vertically adjustable on the standards 143 and 145. They may be clamped in any adjusted positions. Scales 149, calibrated in terms of cloth width to be run, are placed adjacent the supports 147 so that both of the latter may be consistently adjusted.

Supported in turn on the supports 147 are laterally slidable paint spray-gun heads or applicators 151. These may be clamped in any adjusted lateral positions adjacent the respective edges of the strip being run.

Figure 13:
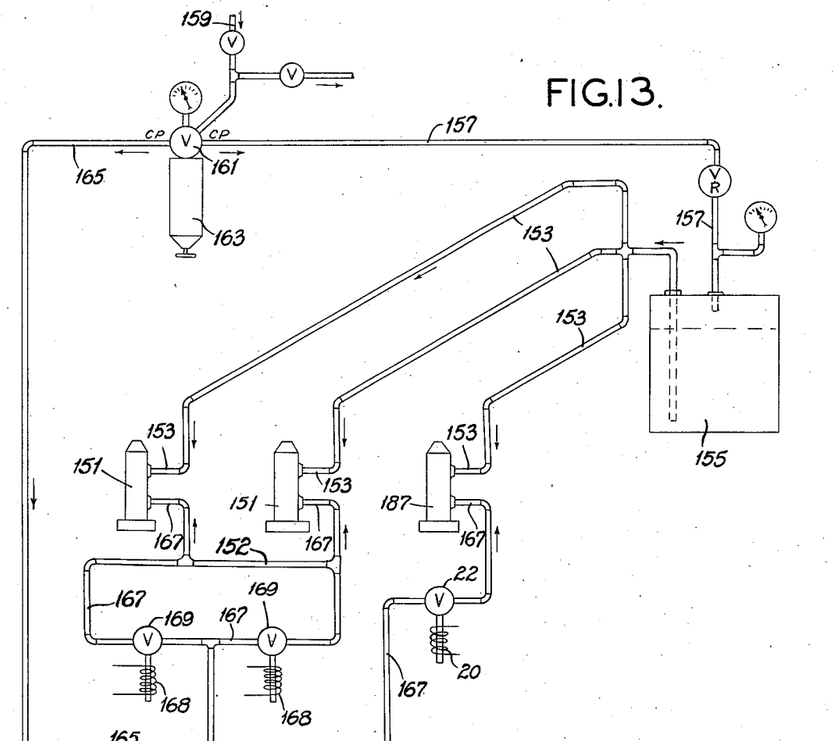
Fig. 13 is a diagram of certain pneumatic and hydraulic circuits.

These paint spray-gun heads are known types of heads which are supplied from a pressure paint tank 155 with paint over liquid pressure lines 153 (Fig. 13). Air pressure is supplied upon the paint in the tank 155 to force the paint out over lines 153. Air line 157 supplies the tank 155 at, say, 10 pounds per square inch. This line leads from a suitable supply line 159 operating at 80 pounds per square inch, for example. The air from the line 159 is reduced in pressure in the line 157 by means of a reducing valve 161. It also has water and other impurities separated therefrom in the separator 163.

Air is supplied to the usual spraying means in the spray-gun heads 151 by means of an auxiliary air line 165 which feeds the guns per se through respective lines 167, the latter lines being under control of solenoid valves 169.

The spray heads 151 are of known type wherein, whenever air pressure is applied over an air supply line such as 167, a paint valve in the head is opened, with the result that atomized paint is projected from the respective nozzle until the air is again cut off. The purpose of the tank 155 is simply constantly to supply paint over the lines 153 to the paint valves in the heads 151.

Figure 12:
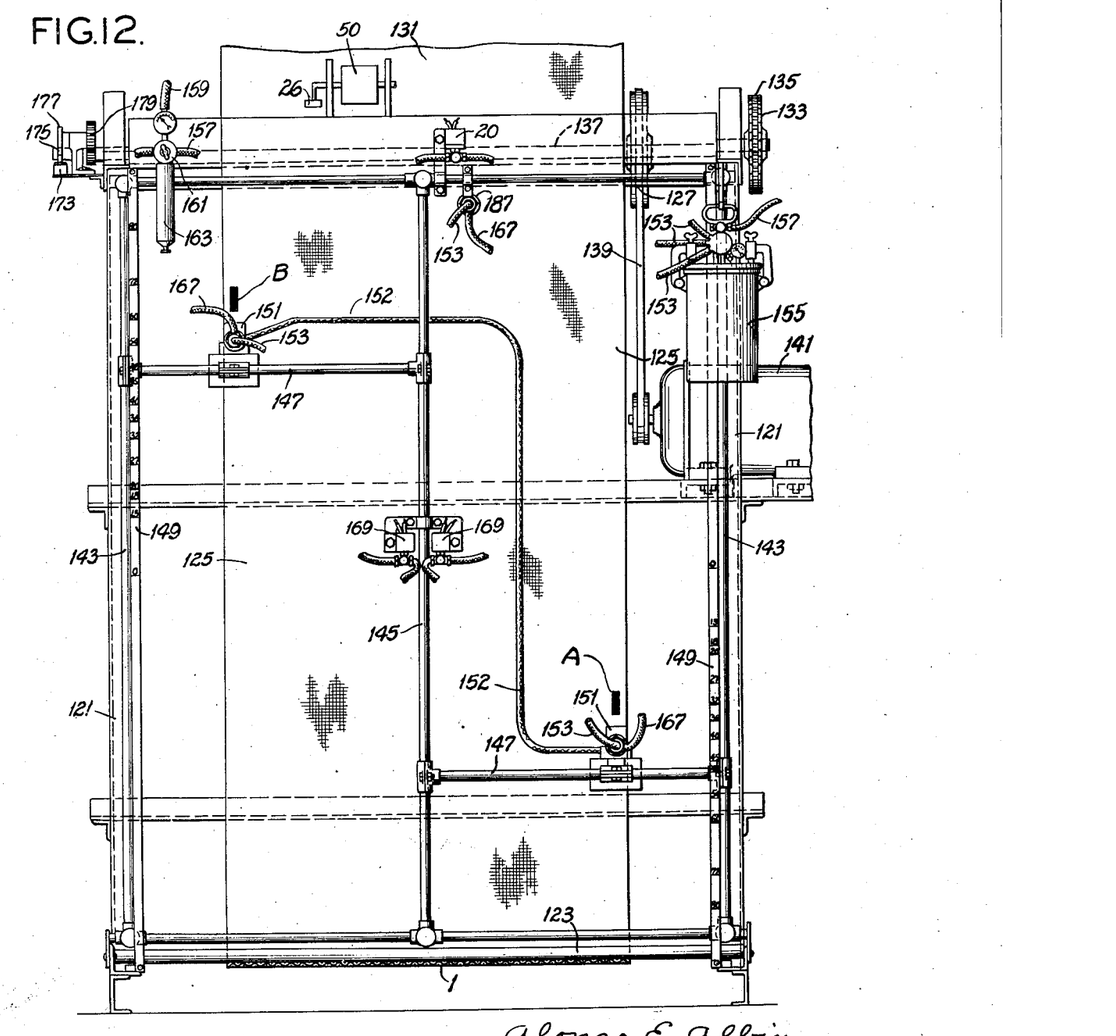
Fig. 12 is an elevation of Fig. 11 taken from the right.

The result is that it is possible by intermittently and simultaneously operating the valves 169 to apply index marks A and B to the adjacent reach 125 of material 1. Since it is desired to have the marks at the edges of the material, the spray-gun heads 151 are located oppositely said edges as shown in Fig. 12. The heads are interconnected as shown at 152 in order to assure similar air pressure conditions and thus simultaneous and similar operations.

In order to operate the solenoid valves 169, there is provided an electric circuit (Fig. 14) wherein the solenoid controls 168 are shown for the respective valves 169. These are connected in parallel in a circuit 171 and in series with a switch 173, the latter being under control of follower 175 which rides upon a rotary cam 177. The cam 177 is driven through a set of gears 179 from the shaft 181 which supports the roller 127. Thus, the angular velocity of the roller 127 and that of the cam 177 are proportional. For each revolution of the cam 177, the switch 173 closes once, thus energizing the solenoids 168 and causing the paint spray heads 151 to spray paint against the edge of the cloth reach 125.

At 183 is shown a manual switch for cutting off the marking operation entirely by breaking the electric circuit to the solenoids 168, and at 185 is shown a manual shunt switch for manually timing the energization of the solenoids 168 and thus the operation of the paint spray heads 151. Such manual operation may sometimes be desirable for special purposes.

Figures 11, 15:
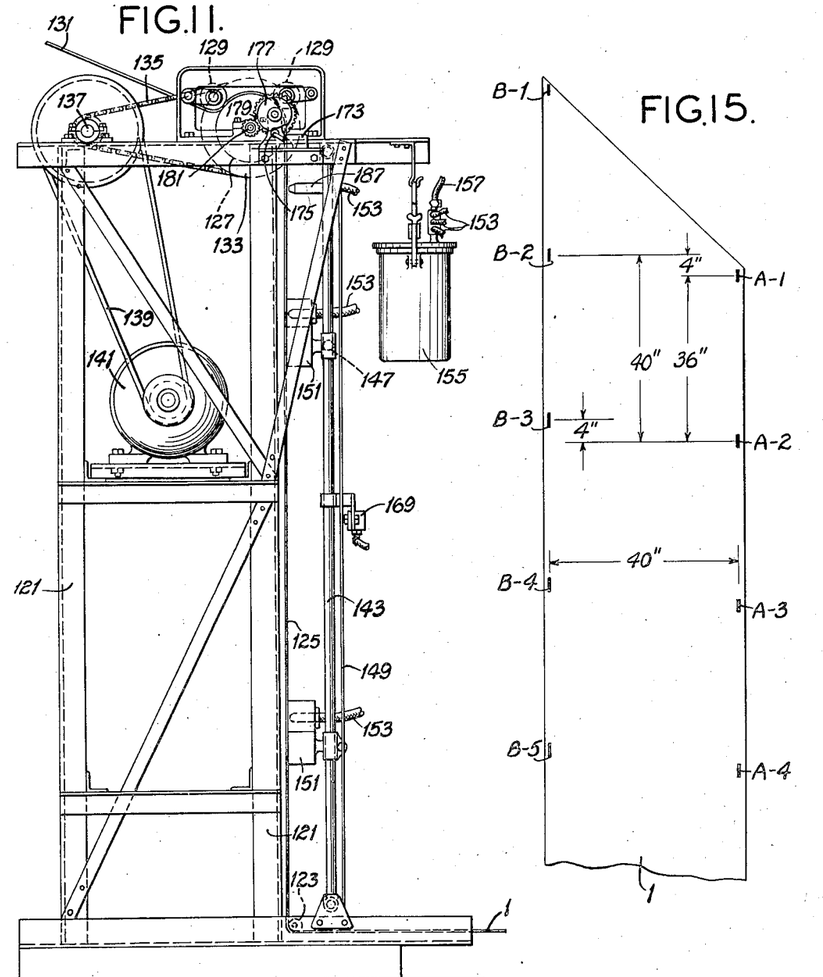
Fig. 11 is a side elevation of an automatic marking machine.
Fig. 15 is a plan view of the marked product of the apparatus shown in Figs. 11-14.

In Fig. 15 is shown a typical result obtained from the marking machine of Figs. 11–13. It will be appreciated that both spray-gun heads 151 operate simultaneously and for a given set of gears 179 in a given proportion to the advance of the cloth 1. This means that the distance between marks made by a given spray head cannot readily be changed, yet it is desirable to change the distance for the different cloth widths which go to make different diameters of tubing.

If the spray heads 151 are located a distance apart approximately equal to the lateral distance between the marks made thereby, then there will be produced a preferable 45° helix angle, where marks B—1, A—1; B—2, A—2; etc., are joined by the sewing machine operator.

Referring to Fig. 15, the left-hand marks applied will again be designated as B—1, B—2, etc., and the right-hand marks A—1, A—2, etc. A 40″ width of cloth will be assumed, exclusive of selvage, as shown. It will thus be seen that each mark B—1, B—2, etc., which is to be registered with the proper mark A—1, A—2, etc., for effecting a 45° helix, must be 40″ ahead of the respective "A" mark. But, it is not essential that a "B" mark be opposite an "A" mark, but simply that the alternate marks to be connected shall be displaced from one another 40″ along the cloth. Thus, if the distances between marks B—1 and B—2 on the one hand, and A—1 and A—2 on the other hand, is 36″, due to the timing from the cam 177 (say for a most-used cloth width of 36″), then all that is necessary for producing the 45° angle desired on 40″ cloth is to offset the series of "B" marks from the series of "A" marks a distance of 4″ as indicated in Fig. 15, so that the 40″ displacement may be obtained between the "B" and "A" marks which are to be registered. This point is made simply to show that, since there is constancy of the timing by the cam 173, there will be constant distance (36″) between the respective "B" and "A" marks and that the most desired 45° helix angle is maintained by setting the supports 147 apart a distance corresponding to the width of the cloth which is being marked and longitudinally as determined by the scales 149.

It follows also that, should it be desired to change helix angles, this could be done simply by properly adjusting the distance between the bars 147 so that the distance between registering marks "B" and "A" would be proper for the helix angle desired with the given width of cloth being run. Ordinarily, this latter adjustment is not resorted to, because of the preference for the 45° angle. The adjustment markings shown at 149 in Fig. 12 are for approximately a 45° angle. The diagram of Fig. 15 is also for such an approximate angle on 40″ cloth.

It will be understood that if it were desired to have the automatic marker operate to place oppositely located marks "B" and "A" as in Fig. 2, the gear changes could be made at 179 to effect a timing for the operation of the spray guns 151 so that they would space their marks a distance approximately equal to the cloth width, for any width.

Referring again to Figs. 11–14, it will be seen that there is an extra spray-gun nozzle shown at numeral 187, fed by lines which have corresponding numerals and functions to those already described.

Figure 14:
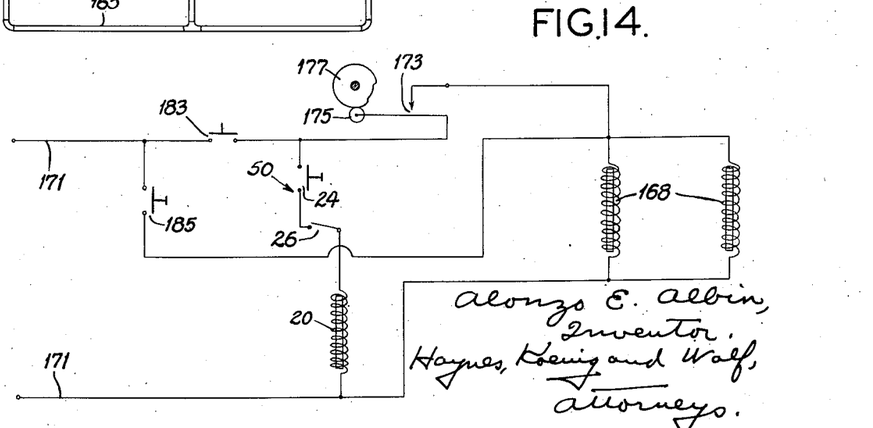
Fig. 14 is an electrical wiring diagram of certain control circuits.

As indicated in Fig. 14, the solenoid 20 for operating the valve 22 which controls the spray nozzle 187 is connected into the circuit 171 ahead of the switch 173 and thus is not under control of said automatic switch 173. It is under control of a timed switch 26, a manually controlled cutout switch 24 being also in the line. The switch 26 is timed and operated by the yardage counter 50 which responds to passage of goods. Thus, while the spray heads 151 may be operated according to the timing of the cam 177, the spray head 187 may be timed for indicating yardage, for example at every 250 yards for purpose of determining amounts for the rolls 71.

It is to be understood that the marking materials used may be any ones desirable. For example, in the hand operation, paint, chalk, crayon, and the like, may be used, and any desirable paint in the automatic operation. It may, if desired, be caused to penetrate the fabric.

Likewise, the character of the strip 1 may be as desired. It may be fabric, paper, and combinations of these, or the like.

It is also to be understood that the term "applicators" refers not only to paint spray heads herein described, but also to equivalent brushes, printing plates and the like for accomplishing the end of marking.

From the above it is clear that the purpose of the indices is to keep one selvage from travelling ahead faster than the other as the tube is sewn. The marks should not appear so frequently as to cause confusion as to which marks are intended to correspond. Thus the seams of corresponding marks may be spread as far apart as happens to be convenient in marking and infrequently enough so as to avoid confusion, and frequently enough to make impossible much relative creeping of selvage between marks. The dimensional examples given above are satisfactory in this respect.

There is no necessity that the indices along one selvage be spaced regularly, the only requirement for successful operation being that the stagger between corresponding indices on opposite selvages be constant. Thus, whether the indices on one side be spaced regularly or irregularly, the indices on the other side are similarly spaced at a constant stagger.

The terms first, second and third, in reference to indices placed on opposite edges, refer respectively to staggered indices which are ultimately joined according to the respective numbers.

Complying with rule 43 of the Patent Office, reference is here made to the following applications of applicant's assignee:

"Gardner et al. patent application Serial No. 220,670, filed July 22, 1938, for Packaging method and article, wherein a form of the fabric tubing herein referred to is claimed per se;

"Gardner et al. patent application Serial No. 300,500, filed October 21, 1939, for Packaging method, wherein a method of using the fabric tubing herein is claimed;

"Ewer et al. patent application Serial No. 342,098, filed June 24, 1940, for Fabric tubing, wherein a method is claimed of making said fabric tubing inside-out, and wherein such inside-out tubing is claimed."

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. The method of manufacturing helically seamed tubing from a single flat strip, comprising indexing the edges of the flat strip at intervals staggered according to a fixed distance, seaming together by means of a stationary sewing machine said opposite edges while registering successive indices on opposite edges, whereby twist occurs in the resulting non-rotating, collapsed and seamed tubing, moving the last-named tubing axially without rotation, and continuously untwisting and rolling up said tubing by rotary motion around an axis at right angles to the tubing and by a simultaneous rotary motion upon an axis parallel to the tubing.

2. The method of rolling up collapsed twisted flexible tubing comprising initially moving the tubing longitudinally without substantial rotation about the tubing axis, rolling up the tubing on a roll by a rotary motion around an axis at right angles to the tubing axis, and effecting a simultaneous controlled relative motion between the roll and tubing only adjacent to the roll and about an axis parallel to the tubing.

ALONZO E. ALBIN.